Figure 8:
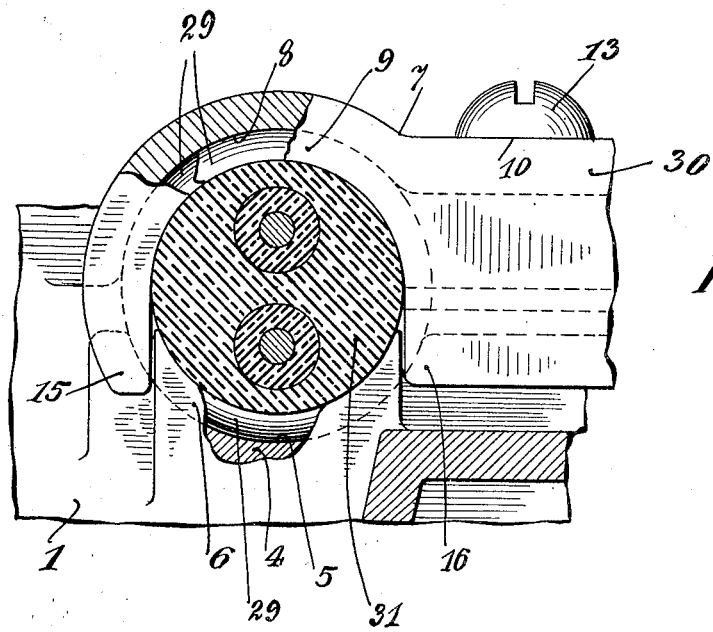

Apr. 10, 1923.
L. H. CHURCH ET AL
1,450,972
OUTLET BOX
Filed Aug. 19, 1921. 2 sheets-sheet 1
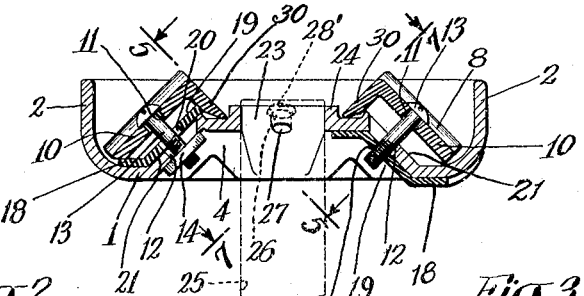
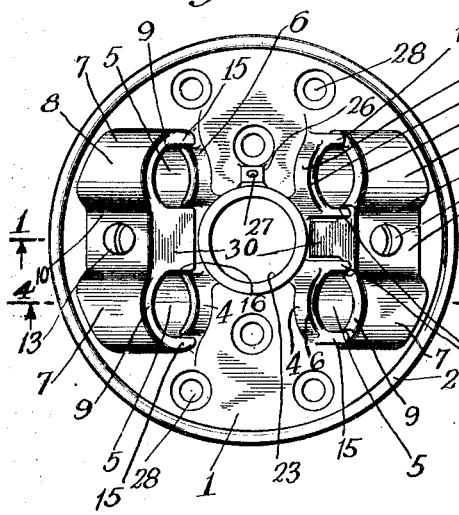
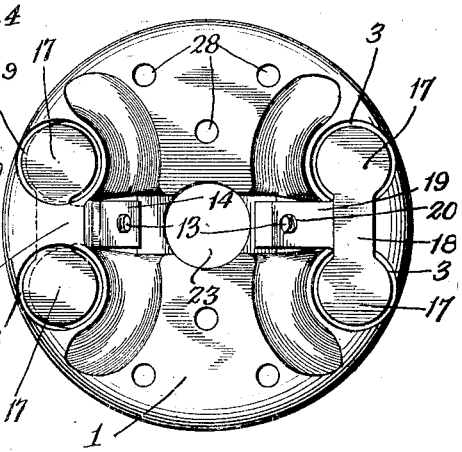
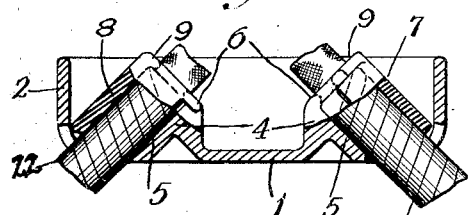
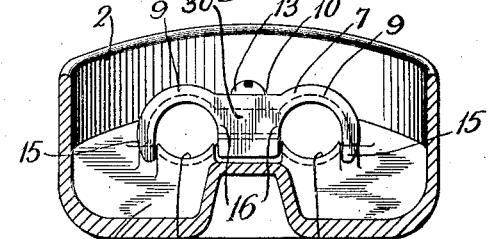
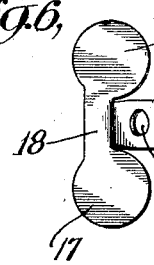
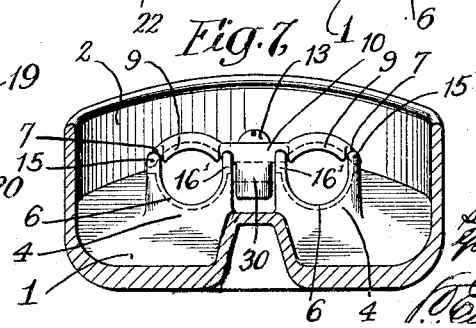
INVENTOR
Lewis H. Church
George C. Houser Jr.
ATTORNEY Apr. 10, 1923.

L. H. CHURCH ET AL

OUTLET BOX

Filed Aug. 19, 1921

Patented Apr. 10, 1923.                                                  1,450,972

UNITED STATES PATENT OFFICE.

LEWIS H. CHURCH, OF ROSELLE, AND GEORGE C. THOMAS, JR., OF ELIZABETH, NEW JERSEY, ASSIGNORS TO THE THOMAS & BETTS CO., OF ELIZABETH, NEW JERSEY, A CORPORATION OF NEW JERSEY.

OUTLET BOX.

Application filed August 19, 1921. Serial No. 493,572.

*To all whom it may concern:*

Be it known that we, LEWIS H. CHURCH and GEORGE C. THOMAS, Jr., both citizens of the United States, and residing, respectively, at Roselle, in the county of Union and State of New Jersey, and at Elizabeth, in the county of Union and State of New Jersey, have invented certain new and useful Improvements in Outlet Boxes, of which the following is a specification.

Our invention relates to outlet boxes, and particularly to novel constructions by which electrical cables or conduits, or the like, are connected to the box.

One of the objects of our invention is to provide an outlet box, together with adjustable means for clamping an electrical cable, conduit or the like therein, and more specifically, to provide clamping means adapted to accommodate cables of various sizes, and at the same time to provide a substantially continuous shoulder for the various sizes of cables, conduits or the like, which it may be desired to secure to the outlet box or plate. A further object of our invention is to provide an outlet box and clamping means of the character referred to, of such design and construction that the device may be easily and inexpensively manufactured, and constructions which permit the use of plain uncored castings without any machine work for the clamping means. Another object of our invention is to provide an improved form of knockout and adjustable means for removably mounting the same on the outlet box or plate. Other objects of our invention comprise improved constructions of parts and combinations of elements which will be in part obvious and in part pointed out hereinafter.

In accordance with our invention, the outlet box or plate, as distinguished from the clamping means and knockout, is of usual construction and is provided with the usual inlet openings at one or more places. The means for removably clamping an electrical conduit, cable or the like to the outlet box or plate, and the knockout and the means for holding a knockout removably in position on the outlet box or plate are novel. The means for clamping an electrical conduit or cable, or the like, to the box comprises two separate parts, one part providing a seat for the cable or conduit, and having a curved shoulder at its inner end adapted to clamp against one side of the cable. This seat member may be formed integrally with the outlet box or plate adjacent one of the inlet openings, or the seat member may be secured to the box or plate by any suitable means, or it may be merely loosely positioned in the proper place in the outlet box. The other part of the clamping means comprises a clamp member, which member also has a curved shoulder at its inner end and is adapted to clamp against the other side of the cable or conduit. The shoulder on the seat member and the shoulder on the clamp member are adapted to cooperate to form a substantially continuous annular shoulder, and one of these shoulders is extended so as to radially overlap the shoulder on the other member and thus maintain a substantially continuous shoulder for any one of a number of cables or conduits of different diameters. Means are provided for holding the two parts of the clamping means in position on the box and for forcing the clamping member towards the seat member to clamp a cable or conduit therebetween, or to hold a knockout in position on the box. The clamp member is preferably provided with a stirrup or plate containing a perforation adapted to register with a similar perforation in the wall or plate of the outlet box to permit of adjustment by means of a screw extending through both said perforations and a nut on the screw. If desired, a knockout may be provided, and this knockout may have an extension containing a threaded perforation adapted to engage the end of the screw extending through the perforations in the outlet box or clamp, so as to be held in position by the screw. In this case, the nut on the screw may be dispensed with, and the knockout permitted to function in its place. The construction above described permits the use of cheap, plain, uncored castings without any machine work for the clamping members, and at the same time there is provided a continuous shoulder for the various sizes of steel armored cables or conduits, or the like, which it may be desired to secure to the outlet box or plate. The form of knockout which has an extension containing a threaded perforation renders unnecessary the drilling and tapping of screw holes in the outlet plate or box body, or the use of a nut on the forcing screw.

Figure 9:
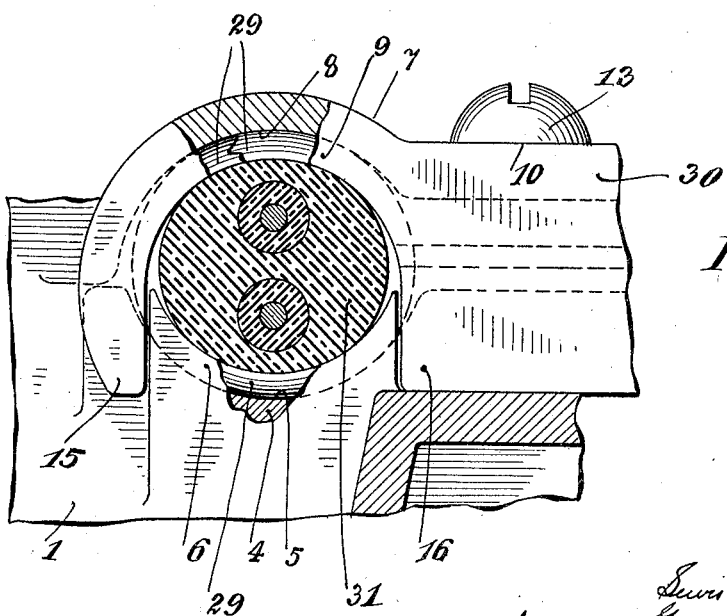

In order that a clearer understanding of our invention may be had, attention is hereby directed to the accompanying drawings forming part of this application and illustrating certain embodiments of this invention. In the drawings, Fig. 1 is a vertical section of an outlet box embodying our invention and is taken on the line 1—1 of Fig. 2; Fig. 2 is a front elevation of an outlet box embodying our invention; Fig. 3 is a rear elevation of the same; Fig. 4 is a vertical section taken on the line 4—4 of Fig. 2; Fig. 5 is a section taken on the line 5—5 of Fig. 1; Fig. 6 is a plan view of the knockout device; Fig. 7 is a section taken on the line 7—7 of Fig. 1; Fig. 8 is an enlarged view taken on the line 5—5 of Fig. 1 looking in the direction of the arrows and shows the cable clamping means with an armored cable clamped in place, certain parts being broken away for the sake of clearness; and Fig. 9 is a view similar to Fig. 8 which shows an armored cable of smaller diameter clamped in place.

Referring to the drawings, the outlet box or plate, as distinguished from the clamping means and knockout, may be of any one of a number of well known constructions and form, in that, as shown, the outlet box or plate comprises a base or bottom portion 1 and a peripheral wall or flange 2 extending upwardly therefrom, the box or plate being provided with a plurality of inlet openings 3. Our improved clamping means are constructed in two separate parts, one of which parts comprises a seat member 4 disposed in the outet box adjacent an inlet opening 3. Seat member 4 may be formed integrally with the outlet box or plate, as shown in the drawings, and comprises a curved surface 5 extending from the edge of the inlet opening 3 inwardly of the outlet box and at its inner end comprises or forms a bushing 6. The seating surface 5 is adapted to serve as a seat for an electrical cable or conduit 22, or the like, extending through the inlet opening 3, and is adapted to clamp against one side of this cable. The other part of the clamping means preferably comprises a clamp 7 having a curved portion 8 adapted to extend from the edge of the inlet opening 3 inwardly, and having a shoulder 9 at its inner end adapted to cooperate with the shoulder 6 on the seat member 4, so as to form a substantially continuous annular shoulder therewith. The clamp 7 is preferably provided with a stirrup 10 which is perforated as at 11, perforation 11 being adapted to register with a similar perforation 12 in the outlet box, so that the clamping portion 8 may be forced toward the seat member 4 by means of a screw 13 extending through both of said perforations and a nut 14 on the screw adapted to engage the opposite side of the outlet box. One of the shoulders, either 6 or 9, is arranged to overlap the other, so that these shoulders will cooperate to form a substantially continuous annular shoulder which is variable in diameter to a certain extent. Thus the shoulder is adapted to positively protect the electrical wire and insulation 31 of cables of various diameters from being cut or frayed by the rough edge 29 of the surrounding steel armor, when clamped between the seat 5 and the clamp 7, as shown in Figs. 4, 8 and 9. Flexible steel armor being formed from narrow thin strips of steel spirally wound is compressible under the pressure of the clamps and tends to conform to the shape of the clamp, as shown in Fig. 9. In one form the shoulder portion 9 of the clamp 7 may be extended so as to radially overlap the shoulder 6 of the member 4 radially on one side, as shown at 15, the other side of the shoulder 9 being also carried beyond the other end of shoulder 6, as at 16, as shown in Fig. 5. If desired, instead of having the shoulder member 9 extended so as to radially overlap the ends of shoulder member 6, as at 15 and 16, the corresponding ends of shoulder member 6 may be extended as at 15' and 16', so as to radially overlap the ends of shoulder member 9, as shown in Fig. 7. The clamp member 7 is adapted to be moved toward and from seat member 4 by means of adjusting screw 13, and the clamp 7 is adapted to coact with seat member 4 to hold any one of a number of various sized cables between said members. By reason of the overlapping of the shoulder portions 6 and 9 a substantially continuous annular shoulder is provided for cables of various sizes. An extension piece 30 may be provided on clamp 7 extending between shoulder extensions 16 of adjacent clamps 7, or to be presented between two adjacent shoulder extensions 16' of a pair of seat members 4, as shown in Fig. 2.

When there is no cable extending through an inlet opening 3, the inlet opening may be covered by means of a knockout. This knockout may comprise a circular disk 17 adapted to cover the inlet opening 3, a stirrup 18 extending from the disk 17 and an extension piece 19 extending at an angle from the stirrup piece 18. Extension 19 is provided with a perforation 20, and the knockout is adapted to be positioned over an inlet opening 3 with the perforation 20 of the extension piece 19 positioned between and in registry with the perforation 11 on the stirrup 10 of the clamp 7 and the perforation 12 in the outlet box, with the screw 13 extending through perforation 20 as well as through the perforations 11 and 12. This knockout is adapted to be held in position by the screw 13 and nut 14, and may be easily removed from the outlet 3. If desired, the perforation 20 and the extension piece 19 of the knockout may be threaded so as to engage the threads on the screw 13. In this case, and as illustrated in the drawings, the knockout may be placed on the outside of the outlet box or plate with the threaded perforation 20 of the extension piece 19 in engagement with the threads of the screw 13 after the screw has penetrated the perforations 11 and 12. In this event, the nut 14 may be dispensed with, and the clamp member 7 and the knockout may be held in position on the box by reason of the engagement of the screw 13 with the threaded perforation 20. The outlet box may be tapped and drilled for screw 13 if desired.

Although in the above description, reference has been made to a single inlet opening 3 and clamping means and a knockout adapted to be associated therewith, it is possible and expedient to provide inlet openings 3 in pairs and to provide clamping means simultaneously operable to cooperate with a pair of inlet openings, and also to provide a knockout adapted to cooperate with a pair of inlet openings. Such construction is illustrated in the drawing throughout, and, as shown, the two seat members 4 for adjacent inlet openings 3 are connected by a flat surface 21 which is provided with the perforation 12. The clamp members 7 are connected by stirrup 10 which contains the perforation 11, while the shoulder members 9 of the clamp 7 are connected by a flat extension piece 30. The knockout comprises two disks 17 adapted to cover the pair of outlet openings 3 and a flat stirrup 18 connecting the disks 17.

When it is desired to mount a cable 22 in the outlet box through an inlet opening 3, the cable is placed between the seat member 4 and the clamp 7, and the clamp 7 is then forced inwardly by means of screw 13 until the cable is held firmly clamped between the members 4 and 7. When there is no cable extending through an inlet opening 3, the knockout may be placed against the opening in the manner above described. If desired, the outlet box may be provided centrally with opening 23 surrounded by an annular flange 24 adapted to seat around a gas pipe or similar element 25, the flange 24 being preferably provided with a lug 26 containing a slanting threaded perforation 27 adapted to receive a set screw 28', whereby the outlet box may be secured to the gas pipe or other element 25. Screw holes 28 may be provided in the box or plate 1, as usual.

It will be apparent from the above description that the clamping means are adjustable and are adapted to clamp any one of a number of various sized cables to the box, and at the same time since one of the shoulder members, either 6 or 9, overlaps the other, a substantially continuous annular shoulder is provided for the different sizes of cables. It is also to be noted that the cable connected to the outlet box is securely held in position from all sides, and that no opening extends radially through shoulder members 6 and 9.

As many changes could be made in the above construction and many apparently widely different embodiments of this invention could be made without departing from the scope thereof, it is intended that all matter contained in the above description or shown in the accompanying drawings shall be interpreted as illustrative and not in a limiting sense.

What we claim is:—

1. In an outlet box, the combination with an inlet opening, a seat member adjacent said opening, a clamp member adjacent said opening, and means for forcing said clamp member toward said seat member to clamp a cable therebetween, of a shoulder on the inner end of said seat member and a shoulder on the inner end of said clamping member, one of said shoulders being extended to laterally overlap the other of said shoulders, and said shoulders being adapted to cooperate to form a substantially continuous shoulder for any one of a number of different sized cables secured by said clamping means.

2. In an outlet box, in combination, an inlet opening, a seat member adjacent said opening and having a shoulder at its inner edge, a movable clamp having a shoulder at its inner edge, the shoulder on said clamp being extended beyond and cooperating with the shoulder on said seat to form a substantially continuous shoulder, and means to force said movable clamp towards said seat.

3. In an outlet box, in combination, an inlet opening, a seat member adjacent said opening and having a shoulder at its inner edge, a movable clamp having a clamping portion and a shoulder at its inner edge extending beyond said clamping portion, said shoulder being adapted to cooperate with the shoulder on said seat member to form therewith a substantially continuous shoulder, and means to force said movable clamp towards said seat.

4. In an outlet box, in combination, a seat having a shoulder at its inner edge, a movable clamp having a shoulder adapted to extend laterally beyond the shoulder on said seat at both ends, said shoulder cooperating with the shoulder on said seat to form a substantially continuous shoulder, and means to force said movable clamp towards said seat.

5. In an outlet box, the combination with a pair of inlet openings, of a pair of seat members each having a shoulder portion at its inner edge and each adjacent one of said openings, and a one piece clamp having a pair of spaced shoulder portions each adapted to cooperate with the bushing portion of one of said seat members to form therewith a substantially continuous shoulder, and means for forcing said clamp member toward said seat members.

6. In an outlet box, the combination with a pair of inlet openings, of a pair of seat members each having a shoulder portion at its inner edge and each adjacent one of said openings, and a one piece clamp having a pair of spaced shoulder portions each adapted to cooperate with the shoulder portion of one of said seat members to form therewith a substantially continuous shoulder, and having a stirrup portion intermediate said shoulder portions, of means for forcing said clamp member toward said seat members, said means comprising a perforation in said stirrup portion and a perforation in said outlet box, a screw extending through said perforations, and a nut threaded under said screw at the opposite side of said box.

7. In an outlet box, the combination with an inlet opening, a seat member, a clamp member, and means comprising a screw for forcing said clamp towards said seat member, of a knockout comprising a disk adapted to block said inlet opening, said knockout having an extended portion containing a threaded perforation adapted to engage said screw, whereby said knockout is held in place over said inlet opening and said clamp is simultaneously forced toward said seat member.

8. In an outlet box, the combination with a pair of inlet openings, a seat member adjacent of each of said openings, and a clamp member adapted to cooperate with both of said seat members simultaneously and to be movable relatively thereto, of a knockout for both of said inlet openings, said knockout comprising a pair of spaced disks adapted to block both of said inlet openings, a stirrup connecting said disks and an extension piece on said stirrup, said extension piece having a threaded perforation, and means comprising a screw adapted to engage said clamp and said threaded perforation in said extension piece, whereby said disks are held in place over said inlet openings and said clamp member is simultaneously forced toward said seats.

9. In an outlet box, the combination with an inlet opening, of a seat member adjacent said opening, and having a seat portion and a shoulder on the inner end of said seat portion, said shoulder having a portion extending upwardly of said seat portion, a clamp member having a shoulder at its inner edge and adapted to cooperate with the shoulder on said seat member to form therewith a substantially continuous shoulder, one of said shoulder portions laterally overlapping the other shoulder portion, and means to force said clamp member towards said seat member.

10. In an outlet box, the combination with an inlet opening, of a seat member adjacent said opening and having a seat portion and a shoulder portion, a part of said shoulder portion extending upwardly of said seat portion, a clamp member having a shoulder at its inner edge, means for moving said clamp member towards said seat member, one of said shoulder portions overlapping the other shoulder portion and cooperating therewith to form a substantially continuous shoulder for any one of a number of cables of various sizes when engaged between said seat member and said clamp member.

11. In an outlet box, the combination with an inlet opening, of a seat member adjacent said opening and having a shoulder at its inner edge, a clamp member adjacent said opening and having a clamping portion and a shoulder at its inner edge extending beyond said clamping portion, means for forcing said clamp member toward said seat member to clamp a cable therebetween, and said shoulders cooperating together to form a substantially continuous shoulder for any one of a number of cables of various diameters when clamped between said seat and clamp members.

This specification signed and witnessed this 13th day of August, 1921.

LEWIS H. CHURCH.
GEORGE C. THOMAS, Jr.

Witnesses:
ROBERT C. BARNES,
WALTER PETERS.